United States Patent [19]
McOnie

[11] Patent Number: 5,192,085
[45] Date of Patent: Mar. 9, 1993

[54] RUBBER DRIVE SYSTEM MECHANICAL SEAL

[76] Inventor: Robert McOnie, 1485 A 29th St., Kenner, La. 70062

[21] Appl. No.: 847,748

[22] Filed: Mar. 2, 1992

Related U.S. Application Data

[63] Continuation-in-part of Ser. No. 628,372, Dec. 17, 1990, abandoned.

[51] Int. Cl.[5] ............................................. F16J 15/38
[52] U.S. Cl. ..................... 277/81 S; 277/81 R; 277/92; 277/93 SD; 277/136
[58] Field of Search ............... 277/81 S, 94, 92, 81 R, 277/136, 93 SD

[56] References Cited

U.S. PATENT DOCUMENTS

| | | | |
|---|---|---|---|
| 2,395,095 | 2/1946 | Brady, Jr. | 286/11 |
| 2,828,983 | 4/1958 | Hunt | 286/9 |
| 2,994,547 | 8/1961 | Dolhun | 286/11.13 |
| 3,024,048 | 3/1962 | Kobert | 277/12 |
| 3,025,070 | 3/1962 | Copes | 277/39 |
| 3,269,738 | 8/1966 | Baumler et al. | 277/81 |
| 3,447,810 | 6/1969 | Porter | 277/85 |
| 4,275,889 | 6/1981 | Butler et al. | 277/42 |
| 4,410,188 | 10/1983 | Copes | 277/65 |
| 4,576,384 | 3/1986 | Azibert | 277/81 |
| 4,779,876 | 10/1988 | Novosad | 277/81 |

Primary Examiner—William A. Cuchlinski, Jr.
Assistant Examiner—Daniel G. DePumpo
Attorney, Agent, or Firm—Phelps Dunbar

[57] ABSTRACT

A mechanical seal particularly well suited to use in rotary equipment handling abrasive slurries. The seal comprises a split rotary face biased toward a split stationary face by a cone spring. The cone spring is encased in elastomeric material which includes molded lugs which serve to transfer rotary motion from a drive sleeve to the rotary housing which contains the split rotary face. The seal forms a unitary cartridge which may be pre-set through the use of setting plates which establish a predetermined amount of compression of the cone spring.

18 Claims, 2 Drawing Sheets

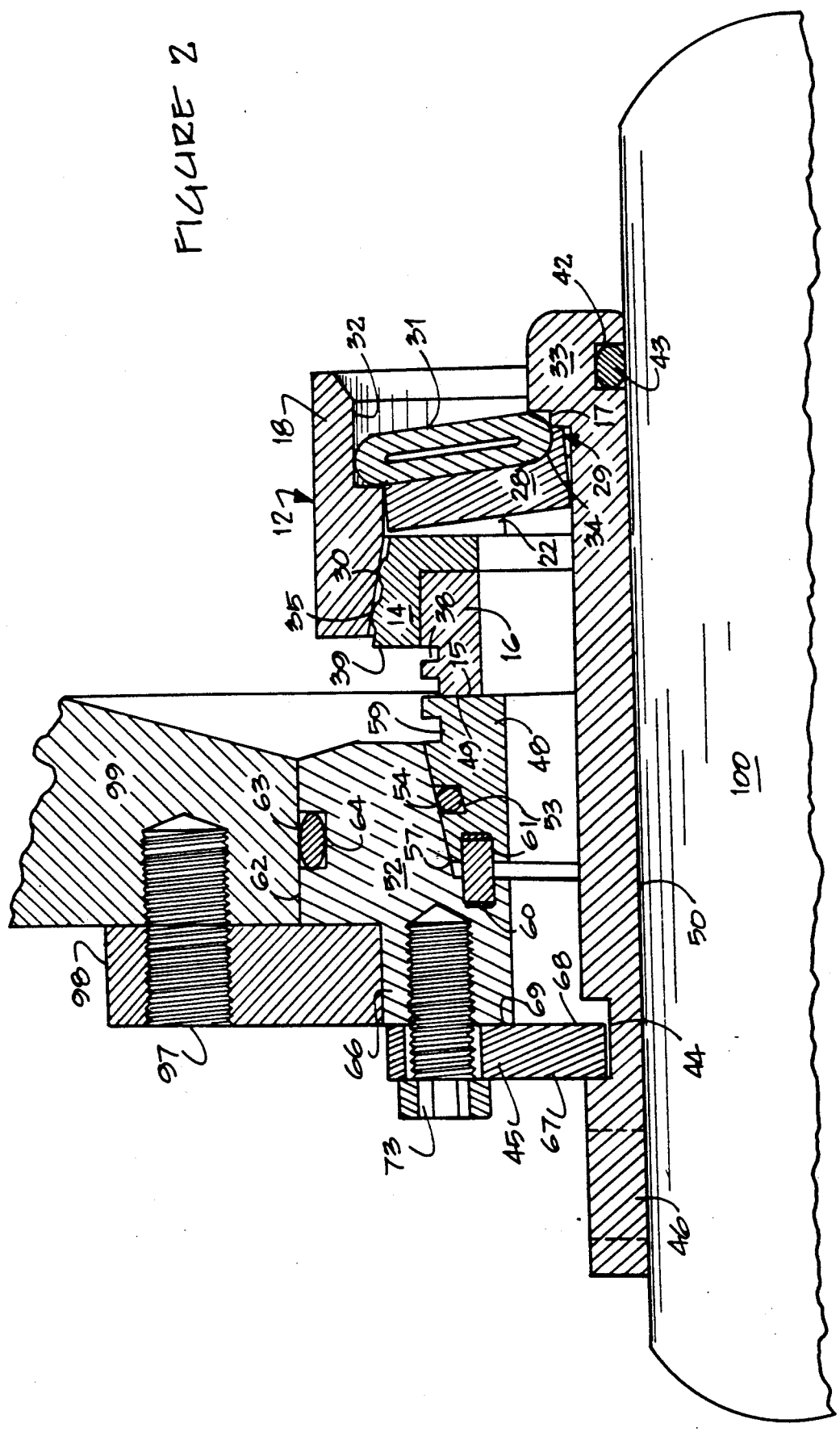

RUBBER DRIVE SYSTEM MECHANICAL SEAL

This is a continuation-in-part of co-pending application Ser. No. 07/628,372 filed on Dec. 17, 1990 now abandoned.

BACKGROUND OF THE INVENTION

This invention relates to mechanical seals for use with rotating equipment such as pumps, mixers, agitators and the like. The invention is particularly well suited for use with rotating equipment used in the moving, agitating or stirring of fluids containing abrasive particles either in solution or in suspension (slurries). In most commonly available rotating equipment a mechanical seal is positioned between a stationary element (such as a pump casing), and a rotating element (such as a rotating shaft) so as to prevent leakage from the rotating equipment of the fluids being moved or mixed. Most seals utilize two distinct flat surfaces or "faces" which are urged together with sufficient force to prevent passage of the contained fluid, yet which can rotate relative to each other.

Slurry mechanical seals are subject to a considerable amount of torsional load (both constant and intermittent) due to the combination of the compressive force urging the seal faces together and the rotation of the faces relative to each other. The torsional load varies with the amount of compressive force, speed of rotation, degree of face lubrication, and varying forces within the fluid containing vessel. Shock torsional loadings on the seal faces caused by changing conditions, including changing hydraulic forces with the fluid containing vessel can result in 'stalling' (prevention of rotary motion) of the rotating element, possibly resulting in damage to the drive mechanism. To reduce the possibility of damage from 'stalling' or an intermittent 'slipstick' condition, the preferred embodiment of the mechanical seal which is the subject of this invention incorporates a system of elastomeric drive lugs in combination with an annular cone spring to accommodate shock torsional loadings.

Slurry mechanical seals are subject to considerable abrasive forces due to their exposure to the abrasive fluids in which they operate, which leads to the wearing of various components of the seal to conditions where the seal needs to be replaced. Abrasive particles can cause deterioration of the seal faces, resulting in leakage of the contained fluid, and necessitating relatively frequent replacement of the damaged faces. To replace a traditional mechanical seal the rotating equipment has to be disconnected from the driving motors and skilled mechanics must dismantle the pump, mixer or agitator, to remove the damaged or worn seal and replace it. Such a seal change may cause an interruption of the process and loss of valuable production time with a relatively high labor and replacement cost. To eliminate such problems mechanical seals were developed having both seal faces separable into two haves ("split"), such that the seal faces could be placed around the shaft of the rotating equipment without removing the equipment from drive mechanism. U.S. Pat. No. 4,576,384 describes a split seal with stationary and rotating wear faces. However, many split seals have a plurality of small parts and fine clearances. When used in an abrasive liquid such seals are subject to excessive wear. Additionally, abrasive material settles in the fine clearances and causes such seals to bind. These difficulties often require a premature change of the seal assembly and a loss of valuable production time. Furthermore, a plurality of small parts and fine clearances makes many such seals difficult to assemble and therefore prone to leaking, due to the possibility of misalignment. The mechanical seal which is the subject of this invention incorporates fractured seal faces attached to elastomeric material which facilitates easy replacement and alignment of the seal faces.

Most mechanical seals utilize a spring or springs to thrust the wear faces of the seal together to prevent leakage. The extent to which the spring is deflected determines the compressive force on the faces. Too little compression may result in leakage across the wear faces; too much compressive may cause "slip-stick" condition, and result in premature wear of the faces.

SUMMARY OF THE INVENTION

The present invention achieves it s objects by the provision of two split mating seal faces for use in combination with rotary and stationary housings. The rotary assembly comprises a tapered rotary housing which accommodates a fractured seal ring with a flexible elastomer cup engages between the rotary housing and the fractured seal ring. The seal ring, prior to fracture, has the elastomer cup both chemically and thermally attached to it. The seal ring is then fractured along two diametrically opposite uneven fracture lines. The elastomer cup is cut along one of the seal ring fracture lines, allowing the cup at the diametrically opposite fracture line to act as a hinge when the fractured seal ring is opened to be placed around the shaft of the rotating equipment during installation. The elastomer cup causes the re-alignment of the two halves of the seal ring when it is fittingly engaged into the tapered rotary housing. The engagement of the elastomer cup into the rotary housing results in a compressive fit between the elastomer cup and the housing thus preventing the leakage of fluid past the cup, while at the same time allowing for flexibility and movement of the rotating fractured seal ring within the rotary housing.

The stationary assembly comprises a one piece seal retainer with a tapered inside diameter into which a fractured seal ring having a corresponding tapered outside diameter in engaged. The tapered portion of the fractured stationary seal ring has a groove into which a split 'O' ring, having a ball and socket joint connection, is located. This 'O' ring is located in the stationary seal ring groove such that the ball and socket joint connection is located adjacent to one of the stationary seal fracture lines. The 'O' ring acts as a hinge mechanism at the diametrically opposite fracture line, thus allowing the stationary seal ring to be opened at the 'O' ring hinge point and placed around the shaft of the rotating equipment. After being placed around the shaft the two halves of the fractured stationary seal ring are re-aligned to form a circular member causing the ball section of the 'O' ring to engage in the socket section, thereby encouraging the fractured seal ring to properly align itself. The fractured stationary seal ring is then offered to and engages in the correspondingly tapered inside diameter of the stationary retainer. The stationary retainer is bolted to the fluid containing vessel in such a manner as to cause the wearing face of the split stationary seal ring to contact the wearing face of the split rotary seal ring.

An annular cone spring is supplied to provide sufficient force, compressing the two wear faces together to prevent leakage of the contained fluid between the faces. The cone spring is placed on the side of the rotary housing opposite the elastomeric cup. It is encased in an elastomeric material which forms fluid tight seal where the spring contacts the rotary housing and the drive sleeve. The required compressive force is established by tightening the retaining bolts on the stationary retainer so as to cause the required deflection of the cone spring. The compressive force is pre-set using setting plates which interact with a groove in the drive sleeve, causing a lateral displacement of the drive sleeve relative to the stationary wear ring when the setting plates are secured.

A seal drive sleeve is fixably attached to the shaft of the rotary equipment to provide for transmission of rotational movement from the shaft of the rotary equipment to the rotary housing and therefore to the fractured rotary seal ring. This transmission of rotation from the seal sleeve to the rotary housing occurs by way of a plurality of raised elastomeric drive lugs located on the inside face of the cone spring. The drive lugs engage into recesses within the seal sleeve and into recesses in the rotary housing. The elastomer cup attached to the fractured rotary seal ring also has a plurality of raised elastomeric drive lugs extending from the rear surface of the elastomer cup which fittingly engage into corresponding recesses in the rotary housing.

It is an object of this invention to provide a mechanical seal cartridge which has a predetermined compressive force applied to the wear faces.

It is further an object of this invention to provide a seal which may be easily serviced, which has a minimum of moving parts, and which may be easily returned to its original compressive setting after service.

It is still another object of this invention to provide a seal which will tolerate high levels of varying torsional load without damage to the seal or the rotating equipment.

It is yet another object of this invention to provide fractured seal rings which do not require bolts, or other fastening devices to maintain alignment.

It is yet another object of this invention to provide a split mechanical seal with fractured wear rings that are easy to replace and align, and that will maintain proper alignment during service.

These and other objects of the present invention will be more apparent to those skilled in the art from the following detailed description of the invention.

BRIEF DESCRIPTION OF THE DRAWINGS

Reference will be made to the drawings wherein like parts are designated by like numerals and wherein:

FIG. 2 is a cross-sectional detail view of the mechanical seal of the present invention.

DETAILED DESCRIPTION OF THE PREFERRED EMBODIMENT

Figure 1:
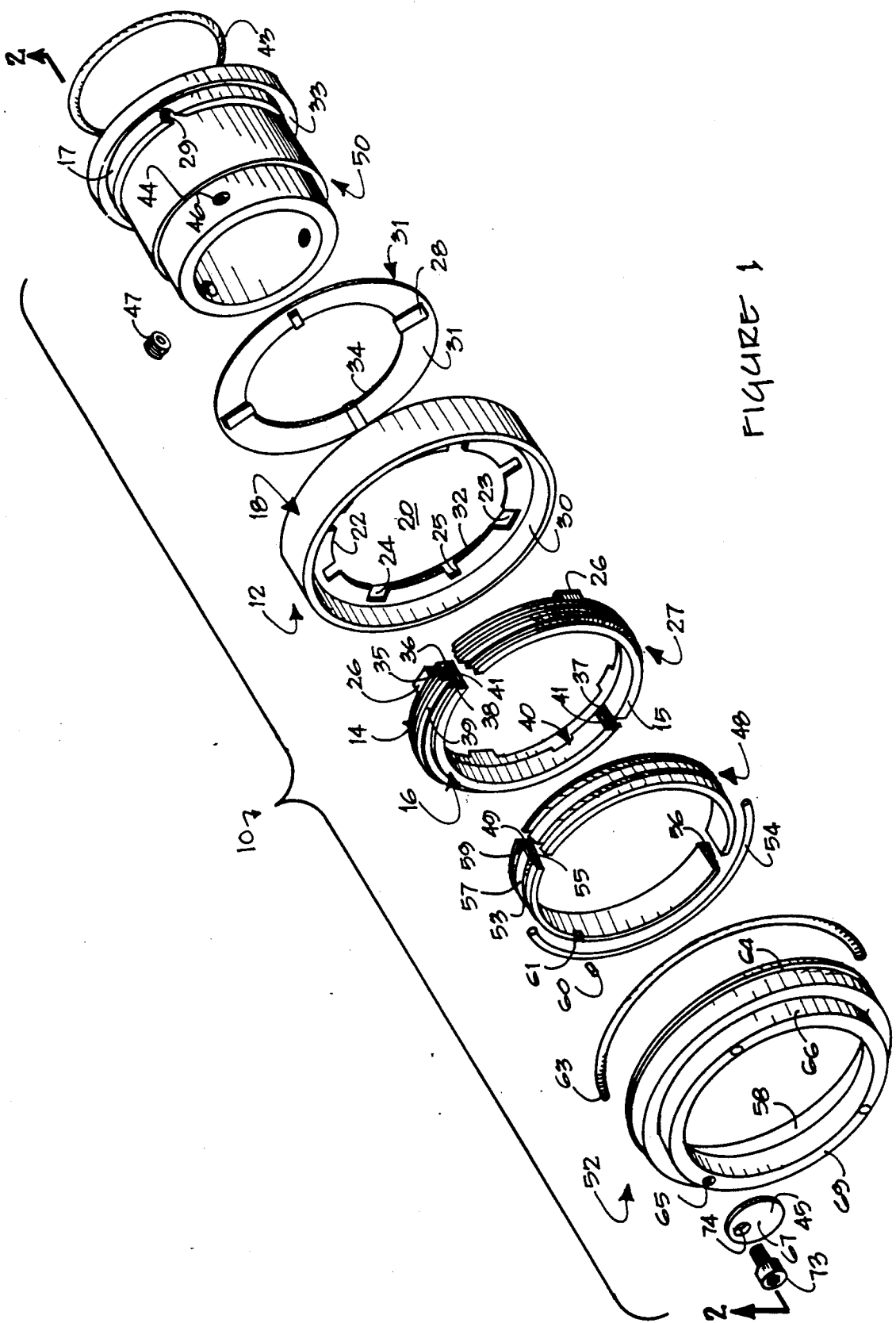
FIG. 1 is an exploded view of the mechanical seal in accordance with the present invention.

Referring now to the drawings in more detail, the preferred embodiment of the mechanical seal of the present invention is generally designated by the numeral 10. As is best seen in FIG. 1, the seal is comprised of as many as six main components, specifically a drive sleeve 50, a core spring 31, a rotary housing 12, a rotary face assembly 27, a stationary seal ring 48, and a stationary seal ring retainer 52.

The rotary face assembly 27 is mounted into one side of the rotary housing 12, and is comprised of an elastomeric rotary face cup 14 and a rotary face seal ring 16, attached to the cup 14. The cup 14 is fitted between the rotary housing 12 and the rotary face seal ring 16.

The rotary housing 12 has an outer lateral portion 18, and an integral web 22 perpendicular to the outer lateral portion and extending inwardly towards a central opening 20. The central opening 20 is of sufficient diameter to allow the rotary housing 12 to easily pass over the drive sleeve 50 without engaging the drive sleeve 50. The web 22 has a plurality of notches 23 located around its inner periphery. These notches 23 are of two dimensional sizes 24 and 25. The notches 23 of size 24 accept a like number of elastomeric drive lugs 26 located on and forming an integral part of the elastomeric face cup 14. The notches 23 of size 24, and drive lugs 26, transmit the rotational forces of the rotary housing 12, to the rotary face assembly 27. The notches 23 of size 25 are dimensioned to accept a like number of elastomeric drive lugs 28 located on and forming an integral part of the cone spring 31. These same drive lugs 28 also engage in notches 29 that are machined in the drive sleeve 50. The drive lugs 28 on the cone spring 31 transmit the rotational forces from the drive sleeve 50 to the rotary housing 12 which in turn transmits the same forces to the rotary face assembly 27.

On one side of the web 22 in the rotary housing 12 there is an opening 30 defined by the outer portion 18 and web 22, that is divergent (outwardly tapering) in its configuration. The rotary face cup 14 is manufactured of an elastomeric material that is molded with an inwardly facing taper (convergent) of the same design angle as that of the opening 30 in the rotary housing 12. This taper is best seen in FIG. 2. The rotary face cup 14 has a plurality of raised riblets 35 on its outer periphery around the complete circumference of the rotary face cup 14. The rotary face cup 14 also includes a plurality of integrally molded drive lugs 26 on its rear face for engagement into the notches 23 of size 24 within the web of the rotary housing 12.

For assembly, the rotary face assembly 27 is offered to the rotary housing 12 with the drive lugs 26 engaging in the notches 23 of size 24. The plurality of raised riblets 35 provide a positive compressive static seal between the split rotary face assembly 27 and the rotary housing 12. The two mating tapers of the rotary housing 12 and the cup 14 are firmly pushed together, causing compression and sealing of the riblets 35 of the rotary face cup 14. The drive lugs 26, being made of an elastomeric material, act as a cushioning or dampening device to accept any shock loads transmitted to or from the rotary face assembly 27.

On the opposite side of the web 22 from the tapered opening 30 is an opening 32, defined by the outer portion 18 and web 22. The inner surface of the outer lateral portion 18 of the rotary housing 12 defining opening 32 is parallel to and coaxial with the drive sleeve 50. The cone spring 31 snugly fits into opening 32, contacting both the inner surface of the outer lateral portion 18 and the web 22 when fully seated. The snug fit between the cone spring 31 and the rotary housing 12 prevents the passage of fluid between these components. When fully seated, the drive lugs 28 engage in the notches 23 of size 25 of the web 22 of the rotary housing 12. The inner face of the cone spring 31 abuts to the web near the outer periphery of the cone spring 31 while the outer circumference of the cone spring 31 contacts the inner surface of the outer lateral portion 18.

The elastomeric drive lugs 28 of the cone spring 31 extend inwardly beyond the inner periphery 34 of the cone spring 31. When the seal is assembled, these inwardly extending drive lugs 28 pass over the drive sleeve 50 and engage a like number of notches 29 of the drive sleeve 50. The inner periphery 34 of the cone spring 31 engages a raised seating ring 17 of the drive sleeve 50. The outer face of the cone spring 31 at the inner periphery 34 of the cone spring 31 abuts against the shoulder 33 of the drive sleeve 50. The fit between the cone spring 31 and the drive sleeve 50 prevents the passage of fluid between these components. The engagement of the drive lugs 28 into the notches 29 of the drive sleeve 50 transmits the rotary forces from the drive sleeve 50 to the rotary housing 12. The drive lugs 28 also act as a cushioning or damping device to accept any shock loads transmitted to or from the rotary face assembly 27.

The elastomeric rotary face cup 14 is securely bonded to the rear portion of the outer circumference of the rotary face seal ring 16. After bonding, the rotary face seal ring is fractured at two points 41, forming approximately equal halves. The cup 14 is cut or otherwise separated entirely through its cross section at a cut line 36 which is directly adjacent to one of the rotary seal ring 16 fracture lines 41. The elastomeric cup 14 may have a partial cut line 37 which does not extend entirely through the cross section of the cup 14. Partial cut line 37 is located at a point adjacent to the other rotary face seal ring 16 fracture line 41 and diametrically opposite cut line 36. Partial cut line 37 of the elastomeric cup 14 acts as a hinge point, allowing the two semi-circular sections of the rotary face assembly 27 to be opened at the fracture points and placed around the drive sleeve 50. After having passed over the drive sleeve 50 the two halves of the rotary face assembly 27 are brought together with the elastomeric rotary face cup 14 acting as a hinge causing the two haves of the rotary face seal ring 16 and the elastomeric cup 14 to properly align themselves along their respective fracture lines 41 and cut lines 36 and 37 creating a full circular component.

The rotary face seal ring 16 has an annular groove 38 machined in its outer periphery forward of the exposed shoulder of the elastomeric cup 14 which is designed to facilitate removal of the rotary face assembly 27 from the rotary housing 12 when required. A pry bar or screw driver is inserted into the groove 38 and by levering against the edge of the outer lateral portion 18 of the rotary housing 12 the rotary face assembly 27 is caused to move forward within the rotary housing 12, disengaging the raised riblets 35 from the tapered opening 30 of the rotary housing 12. With just a small amount of axial movement of the compressive fit between the rotary face cup 14 and the rotary housing 12 is diminished to a point where the rotary face assembly 27 can be easily removed by hand.

The rotary face seal ring 16 has a plurality of notches 40 machined into the rear face into which the elastomeric cup 14 is molded so as to assist in bonding and in the transmission of rotary forces or the acceptance of any shock loading. As previously mentioned, the rotary face seal ring 16 is fractured at two points 41 roughly dividing the circumference of the rotary face seal ring 16 into two semi-circular portions. Fractured materials with a raised granular surface are more readily re-aligned and are less prone to leaking than re-aligned smooth machined surfaces. The fractured face seal ring with elastomeric cup does not require bolts or other securing mechanisms to secure the two portions of the rotary face assembly 27 together.

As is best seen in FIG. 2, an interior groove 42 is machined on the inner surface of the drive sleeve 50. Fitted within the groove 42 is a sealing 'O' ring 43 to ensure liquid tight engagement between the drive sleeve 50 and a rotating shaft 100. The drive sleeve 50 has an annular groove 44 machined in its outer periphery into which a plurality of setting plates 45 engage. At the end of the drive sleeve 50 opposite to which the cone spring 31 is normally seated, the drive sleeve 50 has a plurality of threaded holes 46 passing through its entire section which accept a like number of threaded set screws 47. These set crews 47 when engaged into the drive sleeve 50 and tightened to the rotating shaft 100 hold the rotary element of the seal assembly in a certain axial position relative to the stationary portion of the seal assembly. Changing the axial position of the drive sleeve 50 on the rotating shaft 100 changes the deformation of the cone spring 31. Movement of the drive sleeve axially along the rotating shaft 100 in the direction of the end of the drive sleeve 50 containing the threaded holes 46 results in an increased deformation of the cone spring 31, and increased compressive force on the wear faces of the rotary face seal ring 16 and stationary face seal ring 48.

The stationary portion of the device of the present invention comprises a stationary seal ring 48 which is also fractured into two halves. The face 49 of the stationary seal ring 48 contacts the face 15 of the rotary face seal ring 16. The outer periphery 57 of the stationary seal ring is fitted within a cutout formed within the stationary seal ring retainer 52. Extending around the outer periphery 57 of the stationary seal ring 48 is an annular groove 53 which receives an 'O' ring 54 therein. The 'O' ring 54 is a split type 'O' ring with a ball and socket joint. The 'O' ring 54 is attached by bonding or compressive fit within the 'O' ring groove 53 with the ball and socket joint being located at the stationary seal ring fracture line 55.

The 'O' ring 54 acts as a hinging mechanism to allow the two halves of the stationary seal ring 48 to be opened and placed around the drive sleeve 50. After being placed around the drive sleeve 50, the two halves of the stationary seal ring are brought together with the ball joint of the 'O' ring 54 engaging in its mating socket thereby causing the two halves of the stationary seal ring 48 to properly align themselves and to be retained in a full circular configuration.

As is best seen in FIG. 2, the outer periphery 57 of the stationary seal ring 48 is designed with a convergent taper which engages in a correspondingly divergent taper recess 58 within the stationary seal ring retainer 52. Another groove 59 is machined around the outer circumference of the stationary seal ring 48. Groove 59 allows for the engagement of a screwdriver or pry bar which when levered back against the front face of the retainer 52 will cause the stationary seal ring 48 to move outward and disengage from the tapered recess 58 of the retainer 52. The engagement of the stationary seal ring 48 into the mating tapered recess 58 of the retainer 52 causes the outer tapered periphery 57 of the seal ring 48 to realign and to be held in a compressive fit during normal operation.

Fitted within the retainer 52 is an anti-rotation pin 60 which engages in a notch 61 in the back of the stationary seal ring 48. The pin 60 prevents any rotational movement of the stationary seal ring 48 that may be encouraged by the interface frictional forces developed when rotary face 15 rotates against stationary face 49.

The fracture lines 55 and 56 of the stationary seal ring 48 are sealed by the alignment and fit of the integranular construction of the seal ring material that was exposed during the fracturing process. Natural fracture lines create leakproof joints with a lesser compressive load than that which would be required with smooth machined surfaces.

The stationary seal retainer 52 is of a one part construction (not fractured or split) which is attached to or incorporated within the wall of the fluid containing vessel. The sealing of the retainer 52 to the vessel wall is by way of an elastomeric 'O' ring 63 contained within an annular groove 64 machined into the outer circumference of the retainer 52. This 'O' ring 63 is of the split ball and socket joint construction which allows for easy removal and replacement.

A plurality of setting plates 45 are provided to facilitate the establishment of a predetermined amount of deformation of cone spring 31. The setting plates 45 are generally round in shape with a single hole 74 located close to the outer edge of the setting plate 45. The front 67 and back 68 surfaces of the setting plates 45 are flat. Socket head cap screws 73 pass through oversized holes 74 in the setting plates 45 and engage in threaded holes 65 in the extended axial portion 66 of the stationary seal retainer 52. As is best shown in FIG. 2, tightening of screws 73 causes the back surfaces 68 of the setting plates 45 to align and abut themselves to the exposed flat surface 69 of the axial extension 66 of the retainer 52. With the setting plates 45 in this position and a portion of the opposite flat face 67 engaged in the groove 44 of the drive sleeve 50 (as shown in FIG. 2), the drive sleeve 50 is positioned so as to provide a compressive force on the cone spring 31. These compressive forces are transmitted through the entire section of the cone spring 31 resulting in a compressive force being applied to the rotary housing 12 and the rotary face assembly 27.

The axial displacement of the drive sleeve 50 relative to the stationary seal ring 48 determines the compressive force applied to the seal faces 49 and 15 through the rotary housing 12. A compressive force sufficient to form a positive seal at the interface between the rotary face 15 and the stationary face 49 during the static and dynamic operation of the seal device 10 must be exerted by the cone spring 31. It should also be noted that the fluid hydraulics within the pump casing, or other fluid containment vessel also provides a positive sealing force (closing force) under normal operations. Accordingly, the location of annular setting groove 44 determines the pre-set compressive force exerted by the cone spring 31.

The engagement of the setting plates 45 into the setting groove 44 of the drive sleeve 50 and the tightening of screws 73 establishes a predetermined amount of compressive force on the seal faces. The seal mechanism in this position forms a preset assembly or cartridge that requires no axial or radial adjustments prior to initial assembly or installation into the fluid containing vessel 99.

As shown in FIG. 2, the retainer 52 is held in position by a split flange assembly 98 which is held in position by retaining screws 97 to the exterior wall of the fluid containing vessel 99. The tightening of the split flange 98 causes a sufficient compressive load on the extended axial portion 66 of the retainer 52 so as to prevent any radial motion. Since the split flange 98 is not a fluid sealing component, no type of elastomeric or other type of seal need be established between it or any other contacting surface.

With the seal assembly 10 correctly located within the fluid containing vessel 99 and retained by the split flange 98, the set screws 47 of the drive sleeve 50 are then adequately tightened to the shaft 100. With the seal assembly now locked in this position relative to the shaft 100 the socket head cap screws 73 are loosened and the setting plates 45 are rotated 180°, whereupon the socket head cap screws 73 are tightened to retain the setting plates 45 in this noncontacting operating position. With the setting plates 45 retained in this operating position, the retainer 52 is now prevented from establishing any axial movement in either direction.

The stationary face seal ring 48 and the rotary face seal ring 16 may be replaced without disconnecting the fluid moving equipment from its drive mechanism. The split flange 98 and the flange retaining screws 97 are removed, enabling the retainer 52 and the stationary seal ring 48 to be withdrawn from the fluid containing vessel. With the stationary element withdrawn from the fluid containing vessel a pry bar or screwdriver can now be installed in the groove 59 on the stationary seal ring 48 and leverage applied to withdraw the stationary seal ring 48 from the retainer 52. With the stationary seal ring 48 removed from the retainer 52 the ball and socket joint on the sealing 'O' ring 54 can now be separated, allowing the two halves of the damaged stationary seal ring 48 to be separated and removed.

A new stationary seal ring 48 is opened with the 'O' ring 54 acting as a hinge at the fracture line 56 opposite the 'O' ring ball and socket joint. The new stationary seal ring 48 is placed around the normally rotating drive sleeve 50 and brought together again with the engagement of the ball and socket joint of the 'O' ring 54. The stationary seal ring 48 is then offered to the mating tapered recess 58 of the retainer 52 ensuring the engagement of the anti-rotation pin 60 into the notch 61 in the rear section of the stationary seal ring 48. A sufficient amount of force is applied to ensure the correct seating of the stationary seal ring 48 into the mating tapered recess 58 of the retainer 52.

A pry bar or screwdriver can now be inserted into the groove 38 of the rotary face assembly 27 and by leverage against the edge of the outer lateral portion 18 of the rotary housing 12 the rotary face assembly 27 will be caused to move forward and disengage from the tapered opening 30 of the rotary housing 12. With just a small amount of axial movement there will be a significant decrease in compressive load upon the elastomeric cup 14 enabling it to be easily withdrawn from the rotary housing 12. Upon withdrawal the two halves of the rotary face assembly 27 can be opened and passed around the drive sleeve 50. A new rotary face assembly 27 is opened with the elastomeric cup acting as a hinge point at one of the fracture lines 41, and placed around the drive sleeve 50. The rotary face assembly 27 is then offered to the rotary housing 12 ensuring that the rear drive lugs 26 are engaged in the notches 23 of size 24 in the web 22 of the rotary housing 12 (the engagement of the drive lugs 26 into the notches 23 of the web 22 takes place prior to any compressive load being applied on the riblets 35 on the rotary face cup 14.) A nominal amount of force is then applied to ensure the correct seating of the rotary face assembly 27 into the rotary housing 12.

With the rotary face assembly 27 and the stationary seal ring 48 faces installed, the retainer 52 is then offered to the containment vessel 99 and the split flange assembly 98 is replaced around the axial extension 66 of the retainer 52. With the split flange assembly 98 correctly positioned on the retainer extension 66 the retaining screws 97 are engaged and tightened causing the split flange 98 to realign itself to the exposed wall of surface of the fluid containment vessel 99.

To ensure that the correct amount of compressive force is being applied by the cone spring 31, the socket head cap screws 73 for the setting plates 45 are loosened allowing the setting plates 45 to rotate 180° and re-engage in the setting plate groove 44 in the drive sleeve 50. Loosening the set screws 46 of the drive sleeve 50, and tightening the setting plate socket head cap screws 73 will cause alignment of face 68 of the setting plates 45 with the exposed surface 69 of the retainer extension 66. This will cause any required axial movement of the drive sleeve 50 to occur thus ensuring the correct positioning and deformation of the cone spring 31, resulting in the correct amount of predetermined compressive force on the seal faces 15 and 49. With this resetting of the correct compressive force, the drive sleeve set screws 47 are retightened, the socket head cap screws 73 loosened, the setting plates 45 rotated 180°, and the socket head cap set screws 73 retightened retaining the setting plates 45 in the operating position.

What I claim is:

1. A split ring mechanical seal device for use in rotating equipment, comprising:
   a rotating drive sleeve;
   means for sealably securing said rotating drive sleeve to the shaft of said rotating equipment;
   a fractured rotating seal ring with wear face;
   a fractured stationary seal ring with wear face;
   an annular cone spring removably engaged at its inner periphery to said drive sleeve and removably engaged at its outer periphery to said fractured rotating seal ring whereby a compressive force is applied tending to thrust said wear faces together;
   an elastomeric cup fixably bonded to said fractured rotating seal ring, said cup being cut entirely through its cross section at a point directly adjacent to a fracture line of said rotating seal ring;
   an 'O' ring engaging said fractured stationary seal ring, said 'O' ring being split at a point directly adjacent to a fracture line of said stationary seal ring;
   means for flexibly and sealably transferring rotary motion of said drive sleeve to said rotating seal ring;
   means for sealably securing said stationary seal ring to the vessel wall of said rotating equipment, and
   means for pre-setting the amount of said compressive force tending to thrust said ware faces together.

2. The split ring mechanical seal device of claim 1 wherein said means for flexibly and sealable transferring rotary motion comprises a plurality of elastomeric lugs, one end of which removably engage notches in said drive sleeve, the opposite end of which removably engage notches in said fractured rotating seal ring.

3. The split ring mechanical seal device of claim 1 further comprising an annular rotary housing interposed between said annular cone spring and said fractured rotating seal ring, said annular rotary housing removably engaging said fractured rotating seal ring.

4. A split ring mechanical seal as in claim 1 wherein said rotating seal ring is formed with an annular groove along its circumference for facilitating removal of said rotating seal ring and said elastomeric insert from said rotary housing when required.

5. A split ring mechanical seal as in claim 1 wherein said stationary seal ring is formed with an annular groove along its circumference for facilitating removal of said stationary seal ring from said stationary seal ring retainer when required.

6. The split ring mechanical seal device of claim 1 wherein said means for sealably securing said stationary seal ring to the vessel wall of said rotating equipment comprises;
   an annular stationary seal ring retainer, said retainer being formed with an exterior groove for receiving an 'O' ring and with an extended axial portion within which are contained a plurality of threaded holes for receiving a like number of screws; and
   a split flange assembly dimensioned so as to abut said extended axial portion of said retainer along the outer circumference of said axial portion, and further formed to have a thickness equal to the axial length of said extended axial portion of said retainer, said flange assembly provided with a plurality of apertures to accommodate fasteners for securing said flange assembly to the wall of said rotating equipment.

7. The split ring mechanical seal device of claim 1 wherein said means for presetting the amount of said compressive force tending to thrust said wear faces together comprises:
   an annular groove formed on the exterior of said rotating drive sleeve adjacent one end of said drive sleeve;
   a plurality of setting plates, generally flat and circular in design, of a thickness dimension slightly less than the width of said annual groove on the exterior of said drive sleeve, said plates each possessing an aperture proximate to the outer edge of said plates, and
   means for securing said setting plates to said stationary seal ring whereby said setting plates contact said annular groove on the exterior of said drive sleeve in a manner which displaces said drive sleeve along said shaft of said rotating equipment whereby said annular cone spring is compressed.

8. A split ring mechanical seal device for use with rotating equipment, comprising:
   a rotating drive sleeve containing means for securing said drive sleeve on the shaft of said rotating equipment in a co-axial manner, said drive sleeve being formed with an exterior annular groove adjacent one of its ends, an interior annular groove adjacent the opposite end of said drive sleeve, an exterior outwardly extending seating ring containing a plurality of notches adjacent the end opposite said exterior annular groove, and an exterior outwardly extending shoulder adjacent to said seating ring;
   a rotary housing having an outer ring portion co-axial with said drive sleeve and an inwardly extending integral web of reduced diameter attached in a substantially perpendicular relationship to the middle interior area of said outer ring portion, said web containing a plurality of notches located around its inward periphery, said rotary housing defining a central opening sized and shaped to fit in concentric relationship about said drive sleeve;

a rotating seal ring with wear face fractured into two approximately equal portions, fixably bonded to an elastomeric insert, said insert being dimensioned to fixably engage throughout its circumference said rotary housing along the inner circumference of said outer ring portion of said rotary housing, said insert being provided with a plurality of molded lugs formed on its rear face opposite said seal ring, said lugs dimensioned to fixably engage said notches in said web, said insert being cut entirely through its cross section at a point directly adjacent to a fracture line of said seal ring, said insert further being partially cut at a point directly adjacent to the other fracture line of said seal ring for providing a hinge point in said insert to facilitate removal of said rotating seal ring and said insert from said shaft and to ensure proper alignment of said fracture lines of said rotating seal ring during installation and use;

an annular cone spring encased within elastomeric material, and dimensioned such that its outer periphery sealably contacts throughout its outer circumference said rotary housing at a location proximate to the intersection of said outer ring portion of said rotary housing and said web of said rotary housing, said cone spring being further dimensioned such that its inner periphery sealably contacts throughout its inside diameter said drive sleeve at a location proximate to the intersection of said seating ring and said shoulder of said drive sleeve, said cone spring being provided with a plurality of lugs on its inner concave face, said cone spring lugs being dimensioned to fixably engage said notches in said web, said cone spring lugs extending inwardly beyond the inner periphery of said cone spring so as to engage said plurality of notches on said seating ring, said cone spring applying a compressive force on said rotary housing throughout the entire outer circumference of said cone spring;

a stationary seal ring with wear face fractured into two approximately equal portions, said wear face being of similar dimension to said wear face of said rotating seal ring, said stationary ring being formed with an exterior annular groove for receiving an 'O' ring, said 'O' ring being split at a point directly adjacent to a fracture line of said stationary seal ring, said 'O' ring serving as a hinge at the other fracture line of said stationary seal ring for facilitating removal of said stationary seal ring from said shaft and to ensure proper alignment of said fracture lines of said stationary seal ring during installation and use;

a stationary seal ring retainer, said retainer being formed with an exterior groove for receiving an 'O' ring and with an extended axial portion within which are found a plurality of threaded holes for receiving a like number of screws;

a plurality of setting plates, generally flat and circular in design, of a thickness dimensioned slightly less than the width of said exterior annular groove of said drive sleeve, said plates each possessing an aperture proximate to the outer edge of said plates, said apertures being of diameter slightly greater than the diameter of said screws, such that when said plates are engaged said exterior annular groove of said drive sleeve and said screws are tightened, the interior flat faces of said plates become parallel to and abutted against the exterior flat face of said extended axial portion of said retainer, causing the exterior flat face of said plates to contact the outside wall of said exterior annular groove of said drive sleeve, forcing said drive sleeve to move laterally relative to the remainder of said seal device resulting in a compression of said cone spring; and means for securing said stationary seal ring retainer within said rotating equipment.

9. The split ring mechanical seal device of claim 8, wherein said means for securing of said drive sleeve on said shaft comprises:

a plurality of threaded apertures passing through said drive sleeve located between said exterior annular groove and the end of said drive sleeve nearest said exterior annular groove, a plurality of threaded set screws dimensioned to engage said threaded apertures and secure said drive sleeve to said shaft of said rotating equipment, and a sealing 'O' ring dimensioned to snugly engage said interior annular groove of said drive sleeve so as to ensure liquid tight engagement between said drive sleeve and said shaft of said rotating equipment.

10. A split ring mechanical seal as in claim 8 wherein said rotary housing is formed with an outwardly tapered surface along the interior circumference of said outer ring portion, said tapered surface beginning on the side of said integral web receiving said elastomeric insert and extending from said integral web outward to the end of said outer ring portion, and further wherein said elastomeric insert is formed with an inwardly tapered surface along its exterior circumference of the same design angle as said outwardly tapered surface of said rotary housing such that said tapered surfaces will interact upon insertion of said elastomeric insert into said rotary housing.

11. The split ring mechanical seal device of claim 8 wherein said elastomeric insert is provided with a plurality of raised riblets on its outer periphery around the circumference of said insert for providing a positive compressive static seal between said insert and said rotary housing.

12. A split ring mechanical seal as in claim 8 wherein said rotating seal ring is formed with an annular groove along its circumference for facilitating removal of said rotating seal ring and said elastomeric insert from said rotary housing when required.

13. A split ring mechanical seal as in claim 8 wherein said elastomeric insert has an L-shaped cross section of which a first leg extends in alignment with the interior circumference of said outer ring portion of said rotary housing and a second leg extends in alignment with said integral web of said rotary housing, and further wherein said rotating seal ring is bonded to the inside surfaces of said L-shaped cross section of said elastomeric insert.

14. A split ring mechanical seal as in claim 8 wherein said plurality of lugs on the interior concave face of said cone spring are comprised of molded elastomeric material.

15. A split ring mechanical seal as in claim 8 wherein said stationary seal ring retainer is formed with an outwardly tapered surface along with interior central opening of said retainer and further wherein said stationary seal ring is formed with an inwardly tapered surface along its exterior circumference of the same design angle as said outwardly tapered surface of said retainer such that said tapered surfaces will interact upon insertion of said stationary seal ring into said retainer.

16. A split ring mechanical seal as in claim 8 wherein said stationary seal ring is formed with an annular groove along its circumference for facilitating removal of said stationary seal ring from said stationary seal ring retainer when required.

17. A split ring mechanical seal as in claim 8 wherein said stationary seal ring retainer is fitted with a protruding pin which engages a notch in the rear of said stationary seal ring for preventing rotation of said stationary seal ring within said retainer.

18. The split ring mechanical seal device of claim 8 wherein said integral web of said rotary housing contains a plurality of notches located about its inward periphery, with said notches being of two dimensional varieties, with one of the dimensional varieties of said notches receiving said molded lugs located on said elastomeric insert, and with the other of the dimensional varieties of said notches receiving said molded lugs located on said annular cone spring.

* * * * *